(12) United States Patent
Yamada et al.

(10) Patent No.: US 6,904,535 B2
(45) Date of Patent: Jun. 7, 2005

(54) INFORMATION PROCESSING DEVICE SELECTING NORMAL AND EXCLUSIVE OPERATIONAL MODES ACCORDING TO WAKE UP INSTRUCTIONS FROM A COMMUNICATION INTERFACE SECTION OR AN INPUT/OUTPUT DEVICE

(75) Inventors: Hiroshi Yamada, Kawasaki (JP); Akira Shiba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 613 days.

(21) Appl. No.: 09/811,523

(22) Filed: Mar. 20, 2001

(65) Prior Publication Data

US 2002/0023237 A1 Feb. 21, 2002

(30) Foreign Application Priority Data

Aug. 18, 2000 (JP) ........................................ 2000-248092
Jan. 29, 2001 (JP) ........................................ 2001-019951

(51) Int. Cl.[7] ........................... G06F 1/32; G06F 15/177
(52) U.S. Cl. .......................... 713/324; 713/2; 713/310; 713/323
(58) Field of Search ................................ 713/300, 310, 713/323, 324, 2

(56) References Cited

U.S. PATENT DOCUMENTS

| | | | | |
|---|---|---|---|---|
| 5,522,087 A | * | 5/1996 | Hsiang | 710/18 |
| 5,666,541 A | * | 9/1997 | Sellers | 713/324 |
| 5,748,972 A | * | 5/1998 | Clark et al. | 713/323 |
| 5,922,075 A | * | 7/1999 | Bowker | 713/300 |
| 5,974,552 A | * | 10/1999 | Lim et al. | 713/300 |
| 6,085,328 A | * | 7/2000 | Klein et al. | 713/310 |
| 6,122,748 A | * | 9/2000 | Hobson | 713/323 |
| 6,125,449 A | * | 9/2000 | Taylor et al. | 713/310 |
| 6,393,570 B1 | * | 5/2002 | Henderson et al. | 713/310 |
| 6,631,469 B1 | * | 10/2003 | Silvester | 713/2 |

FOREIGN PATENT DOCUMENTS

| | | |
|---|---|---|
| JP | 5-108539 | 4/1993 |
| JP | 5-173733 | 7/1993 |
| JP | 6-103210 | 4/1994 |
| JP | 7-200122 | 8/1995 |

* cited by examiner

*Primary Examiner*—Chun Cao
(74) *Attorney, Agent, or Firm*—Staas & Halsey LLP

(57) ABSTRACT

An information device for speeding up relatively simple processing such as data reference with respect to an information device such as a personal computer, and an information electric home appliance, a control method of the information device, and a storage medium storing a control program. The information device including interface sections 3-1 through 3-*n*, an input/output device 4, a memory 5, a magnetic disk device (HDD) 6, a display 7 and an audio section 8 connected each other via a processor (CPU) 1 and a chipset 2, the information device having a configuration in which a normal operation mode that executes information processing by making entire functions usable and an exclusive operational mode that executes processing such as data reference by making only a part of functions such as data reference usable is selected in accordance with start-up conditions from either a power-off state or a suspend state.

16 Claims, 11 Drawing Sheets

INFORMATION PROCESSING DEVICE SELECTING NORMAL AND EXCLUSIVE OPERATIONAL MODES ACCORDING TO WAKE UP INSTRUCTIONS FROM A COMMUNICATION INTERFACE SECTION OR AN INPUT/OUTPUT DEVICE

BACKGROUND OF THE INVENTION

1. Technical Field

The present invention relates to an information device that is enabled to process various kinds of information, and at the same time, promptly execute processing according to specific starting-up conditions such as only reference to data from a power-off state or a suspend state, a control method of the information device and a recording medium storing a control program therefor.

2. Description of Related Art

An information device such as an information electric home appliance including a personal computer of the desk top type or the notebook type (hereinafter generally referred to as a personal computer), a set-top box (hereinafter abbreviated as an STB), and the like has a configuration in which a processor and devices such as a display, various kinds of interface sections, various kinds of input/output devices and various kinds of memory are connected by a chipset having a bus control function. In such a personal computer or an STB, each functional section is put in a pause state without power supply if no information processing is executed. The pause state can be divided into a power-off state in which a power switch is turned off and no information processing operation is conducted at all, and a suspend sate in which power saving is intended by storing only data for enabling resumption of information processing while the information processing is suspended or discontinued and turning off only an operational power of a processor or the like.

Then, the information processing can be resumed by turning on the power switch to start up the information device in the case of resuming from the power-off state, and by starting up from peripheral apparatuses of the processor in the case of resuming from the suspend state. A man-machine interface including an input operating device such as a keyboard or a mouse, and a communication apparatus or the like for performing data communication by connecting with wire lines or wireless lines such as infrared rays or electric waves are included in the peripheral apparatuses. In addition, a personal computer of the notebook type can also be configured such that, when a display is folded while a power switch is on, the personal computer goes into the suspend state, and when the display is opened thereafter, the personal computer goes into a normal operation mode.

In the above-mentioned information device, transition in operational state is made between the OFF state in which a power switch is turned off, the suspend state (a sleep state) in which information processing is suspended or discontinued, and the normal operation mode that is an active state for executing information processing as shown in FIG. 4. That is, when the power switch is turned on, the information device goes from the OFF state to the normal operation mode to enable execution of information processing, and when the power switch is turned off in that state, the information device goes to the OFF state. In addition, the information device goes to the normal operation mode by a wakeup event in the suspend state, and if information processing is not executed for a predetermined period of time, the information device goes from the normal operation mode to the suspend state.

FIG. 5 shows a flow chart of conventional resume processing and startup processing, with which an operational power of a CPU (processor) is turned on and a BIOS (Basic Input/Output System) is started up (B5), by a System Power ON (B2) for turning on a power switch to start up in an OFF state (B1) in which a power switch is off, or when a wake-up is performed by an occurrence of a resume event (B4) in a suspend state (B3) in which information processing is suspended or discontinued.

Then, the processing determines whether or not a resume event has occurred in the suspend state (B6), and if a resume event has not occurred, since system start-up would be by turning on the power switch, the system goes to a normal operation state (B11) in accordance with a normal start-up sequence of the BIOS (B7) and a start-up sequence of an OS (operation system) (B8). In addition, if a resume event has occurred in the suspend state, the system goes to the normal operation (B11) in accordance with a normal resume sequence of the BIOS (B9) and a resume sequence of the OS (B10).

Also known is a system for referencing to data or the like processed or managed in an information device from an external apparatus such as a Personal Digital Assistant (PDA) for personal use and updating such data. In this case, processing of reference to or update of data is performed after connecting both the apparatuses by wire lines using a connector and a cable, or connecting them by wireless lines using infrared rays or electric waves, and bringing the information device to the normal operation state considering that start-up from the OFF state or a resume event has occurred from the suspend state of the information device.

In an active state in which a power switch is on, an information device such as a personal computer, or an STB executes various kinds of information processing when put into a normal operation mode as shown in FIG. 4 with operational power supplied to all functional sections such as a processor. In this normal operation mode, power is consumed in each functional section even if data processing is not actually executed. Sounds are also generated by the rotation of a cooling fan. Thus, in the case where information processing is not executed for a predetermined time, the supply of operational power to functional sections consuming large power such as a processor is stopped and the cooling fan is also stopped, and the information device goes to a suspend state for holding state information such that information processing operation can be resumed.

In order to start up the information device from this suspend state, it is set to wake up by a resume event, then, in order to return it to an operation state of before the suspend state, it is necessary to wake up every functional section that has been set to sleep. To do so, it generally takes one minute or more. In addition, since the number of functional sections that are set to sleep increases with the improvement of functions of an information device, time required for the wake-up becomes longer.

In the case where data of an information device is only referred to using a Personal Data Assistant (PDA) for personal use, a cellular phone or the like, since a data transfer rate is increased, reference of data in a short time is possible. However, since time required for the wake-up of the information device from the suspend state is extremely long, there is a problem in that overall time required for data reference is prolonged.

SUMMARY OF THE INVENTION

An object of the present invention is to solve the problems in the foregoing conventional examples by providing an exclusive operational mode apart from normal operational mode, responsive to resume event categories and to conditions for startup from a power-off state, to shorten the transition time to the operational mode, wherein the operational mode is for short-term special access such as for data look-up.

An information device according to claim 1 of the present invention is an information device having a configuration in which interface sections capable of instructing wake-up for starting up each section that has stopped its operation in a power-off state and a suspend state, a man-machine interface, a memory, and a processor are connected by a chipset including a bus control function, the information device being characterized in that an operation mode upon starting up the information device from either the power-off state or the suspend state is divided into a normal operation mode that enables use of entire functions including the man-machine interface and an exclusive operational mode that enables use of a part of functions including the interface section having performed input/output processing of data, the memory, the processor and the chipset, one of the normal operation mode and the exclusive operational mode is selected in accordance with the interface section that has instructed wake-up, and, when the special operation mode is completed, the information device goes to either one of the power-off state and the suspend state that corresponds to the state of before start-up.

An information device according to claim 2 of the present invention is an information device having a configuration in which interface sections, an input/output device, a memory, a display and a processor are connected by a chipset including a bus control function, the information device being characterized in that the information device has a configuration in which an operation mode upon starting up from either a power-off state or a suspend state is divided into a normal operation mode that enables use of entire functions as an information processing function and an exclusive operational mode that enables use of a part of functions as an information processing function, and one of the normal operation mode and the exclusive operational mode is selected in accordance with start-up conditions.

Describing the above with reference to FIG. 1, the information device is an information device having a configuration in which interface sections 3-1 through 3-n, an input/output device 4, memories 5 and 6, a display 7 and a processor 1 are connected by a chipset 2 including a bus control function, and has a configuration in which an operation mode upon starting up from either a power-off state or a suspend state is divided into a normal operation mode that enables use of entire functions as an information processing function and an exclusive operational mode that enables use of a part of functions as an information processing function, and one of the normal operation mode and the exclusive operational mode is selected in accordance with start-up conditions. In addition, the information device may be configured such that, upon starting up from a specific interface section or the input/output device, the information device goes to the exclusive operational mode and supplies operational power only to a resource used in this exclusive operational mode. The information device may be configured such that the information device switches between the normal operation mode and the exclusive operational mode in accordance with the start-up conditions from the power-off state and the suspend state.

In addition, a control method of an information device according to claim 4 of the present invention comprises processes of dividing an operation mode upon starting up the information device from either a power-off state or a suspend state into a normal operation mode that enables use of entire functions as an information processing function and an exclusive operational mode that enables use of a part of functions as an information processing function, and selecting the exclusive operational mode in accordance with start-up conditions from a specific interface section or an input/output device to execute information processing according to the start-up conditions.

In addition, a recording medium storing a control program according to claim 5 of the present invention is a recording medium such as a magnetic disk, an optical disk, or a semiconductor memory storing a control program for an information device having a configuration in which interface sections, an input/output device, a memory, a display and a processor are connected by a chipset including a bus control function, the recording medium storing a control program including a program for executing a normal operation mode that enables use of entire functions of the information device as an information processing function, a program for executing an exclusive operational mode that enables use of a part of functions as an information processing function, and a program for selecting the normal operation mode in accordance with normal start-up conditions upon starting up the information device from either a power-off state or a suspend state and selecting the exclusive operational mode in accordance with start-up conditions from a specific interface section or the input/output device.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

General Configuration

Figure 1A:
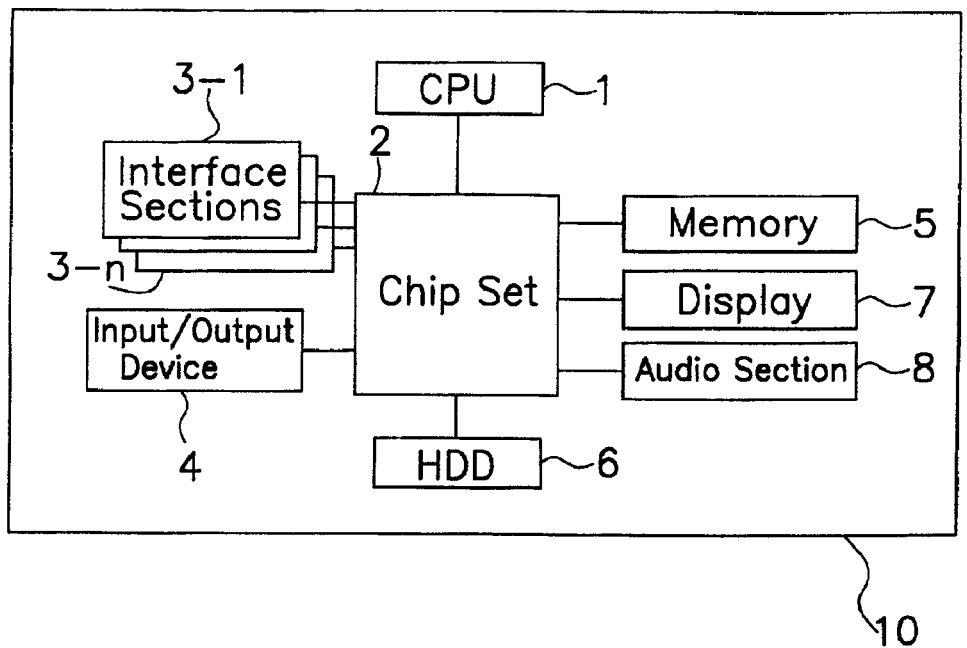
FIG. 1 is a diagram illustrating the main part of an embodiment mode of the present invention.
Figure 1B:
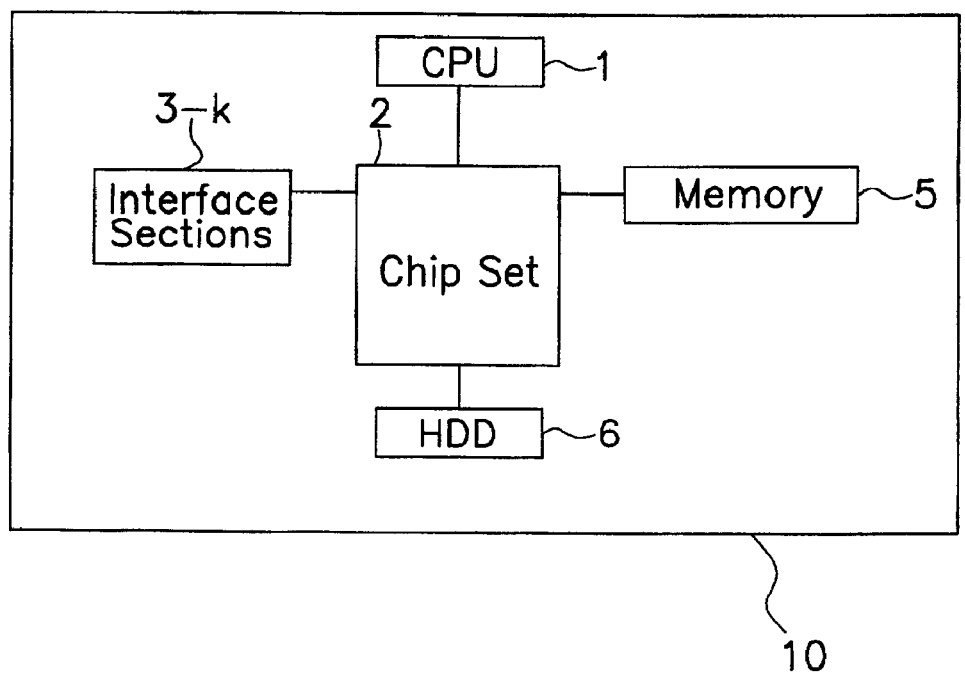

FIG. 1 is a main part diagram illustrating a general configuration of an information device in which an embodiment mode of the present invention is adopted, and (A) shows a configuration of functional sections that are usable at the time of a normal operation mode and (B) shows a configuration of functional sections that are usable at the time of an exclusive operational mode. Each functional section has a configuration including a processor (CPU) 1 for controlling each section and performing information processing, a chipset 2 connecting each section and including a bus control function, interface sections 3-1 through 3-*n* to which various lines and peripheral devices are connected, an input/output device 4 consisting of a man-machine interface such as a keyboard, a mouse, a printer or the like, a memory 5 by means of a semiconductor integrated circuit storage, a hard disk drive (HDD) 6, a display 7 by means of a cathode-ray tube, a liquid crystal panel or the like, and an audio section 8 for music reproduction and telephone call.

In the normal operation mode, the information device, as the configuration indicated in (A), supplies operational power to each section, and executes information processing by the processor 1. On the other hand, in the exclusive operational mode, as shown in (B), for example, in the case of a resume event occurred from the interface section 3-*k*, the information device supplies operational power to the interface section 3-*k*, the CPU 1, the chip set 2, the memory 5 and the HDD 6, and does not supply operational power to other functional sections that the information device does not operate. Therefore, when the information device transitions to the exclusive operational mode by start-up from a power-off state of the specific interface section 3-*k* or a resume event in a sleep state, since required minimum functional sections including the CPU 1 are brought into the operation state, it is possible to considerably reduce time required for the transition compared with the transition to the normal operation mode.

Figure 2:
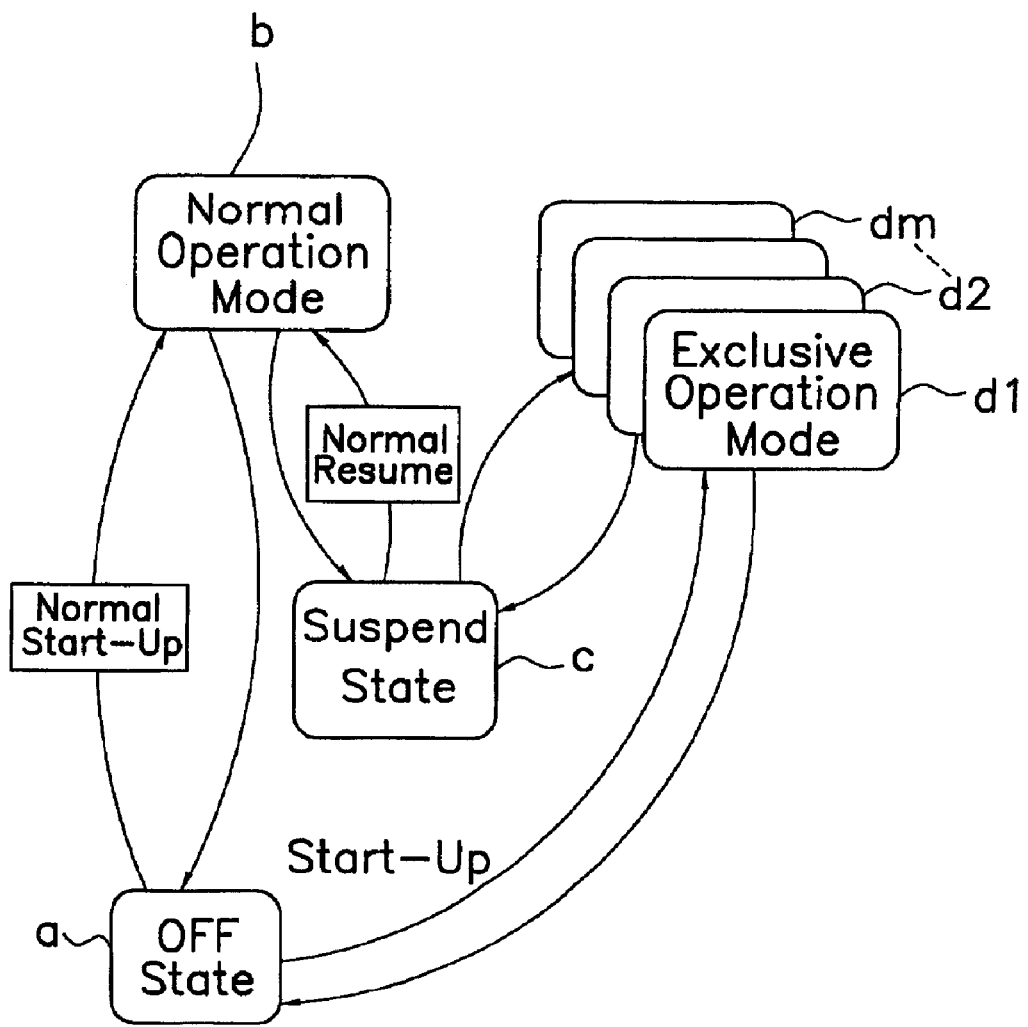
FIG. 2 is a diagram illustrating state transition according to the embodiment mode of the present invention.

FIG. 2 is a diagram illustrating state transition of the embodiment mode of the present invention.

Here, a single or a plurality of exclusive operational modes d1, d2, . . . , dm are provided with respect to conventional operation state consisting of an OFF state a in which a switch is off, a normal operation mode b and a sleep state (suspend state) C. Then, in the case of normal start-up for turning on a power switch from the OFF state a, the information device transitions to the normal operation mode b, and when the power switch is turned off in the normal operation mode b, the information device transitions to the OFF state a.

In addition, a specific interface section or a specific input/output device and a type of the exclusive operational modes d1, d2, . . . , dm are associated, and if the information device is started up from such a specific interface section or specific input/output device in the OFF state a, the information device transitions to the corresponding exclusive operational modes d1 through dm. For example, the information device may be configured such that the information device is transitioned to the exclusive operational mode dk upon starting up from the specific interface section 3-*k* indicated in (B) of FIG. 1.

In addition, if information device is brought into the suspend state for suspending or discontinuing the information processing, the information device is transitioned from the normal operation mode b to the sleep state (the suspend state) c in FIG. 2. If the start-up from this sleep state c is the normal start-up conditions, the information device transitions to the normal operation mode b.

On the other hand, if the start-up is start-up conditions from a specific interface section or a specific input/output device, the information device transitions to the exclusive operations modes d1, d2, . . . , dm associated with the start-up conditions. When information processing by each of the exclusive operational modes d1, d2, . . . , dm is completed, the information device transitions to the initial sleep state c. Alternatively, the information device may be transitioned to the OFF state a depending upon the transitions conditions.

Figure 3:
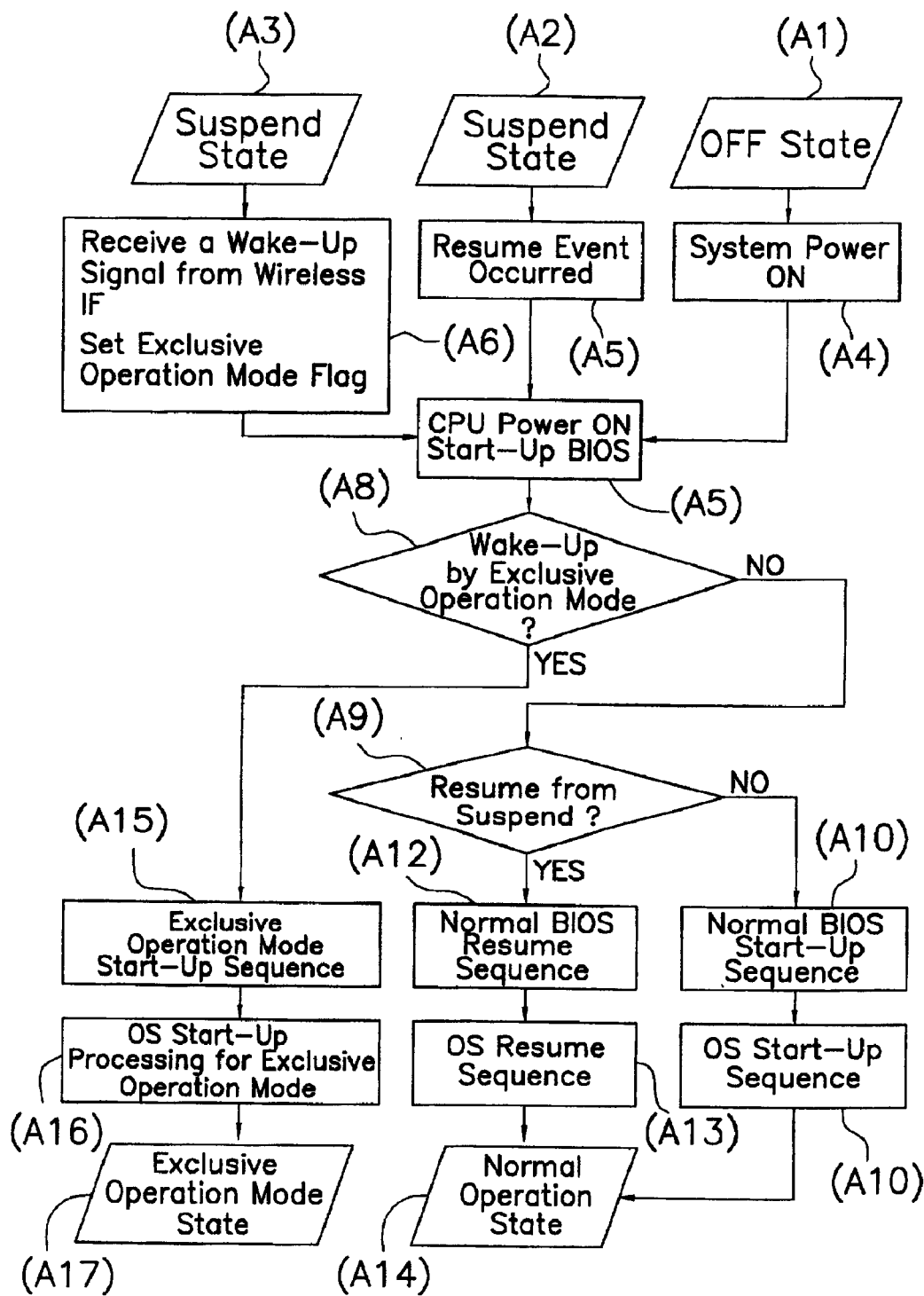
FIG. 3 is a flow chart of resume processing and start-up processing according to the embodiment mode of the present invention.
Figure 4:
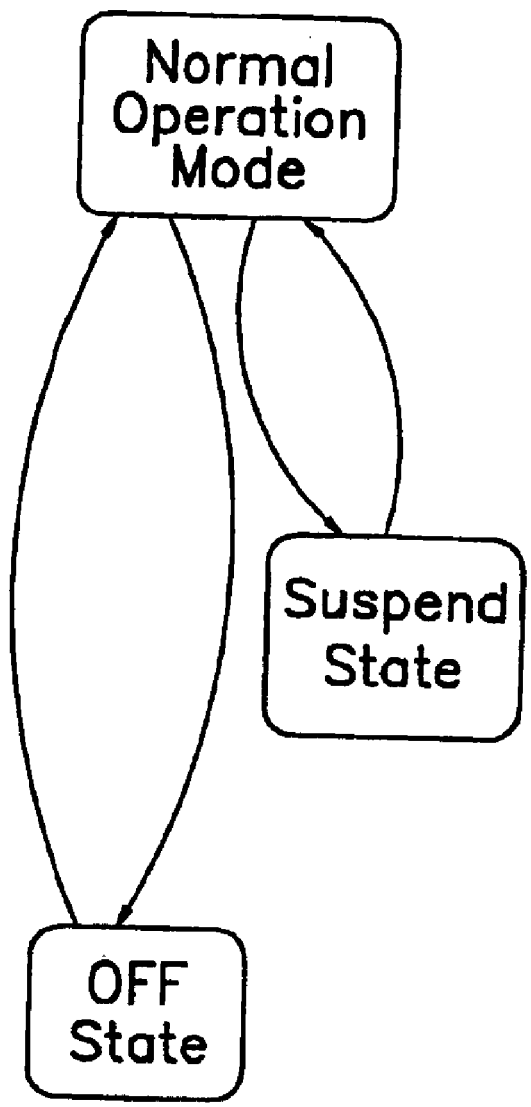
FIG. 4 is a diagram illustrating state transition according to a conventional example.
Figure 5:
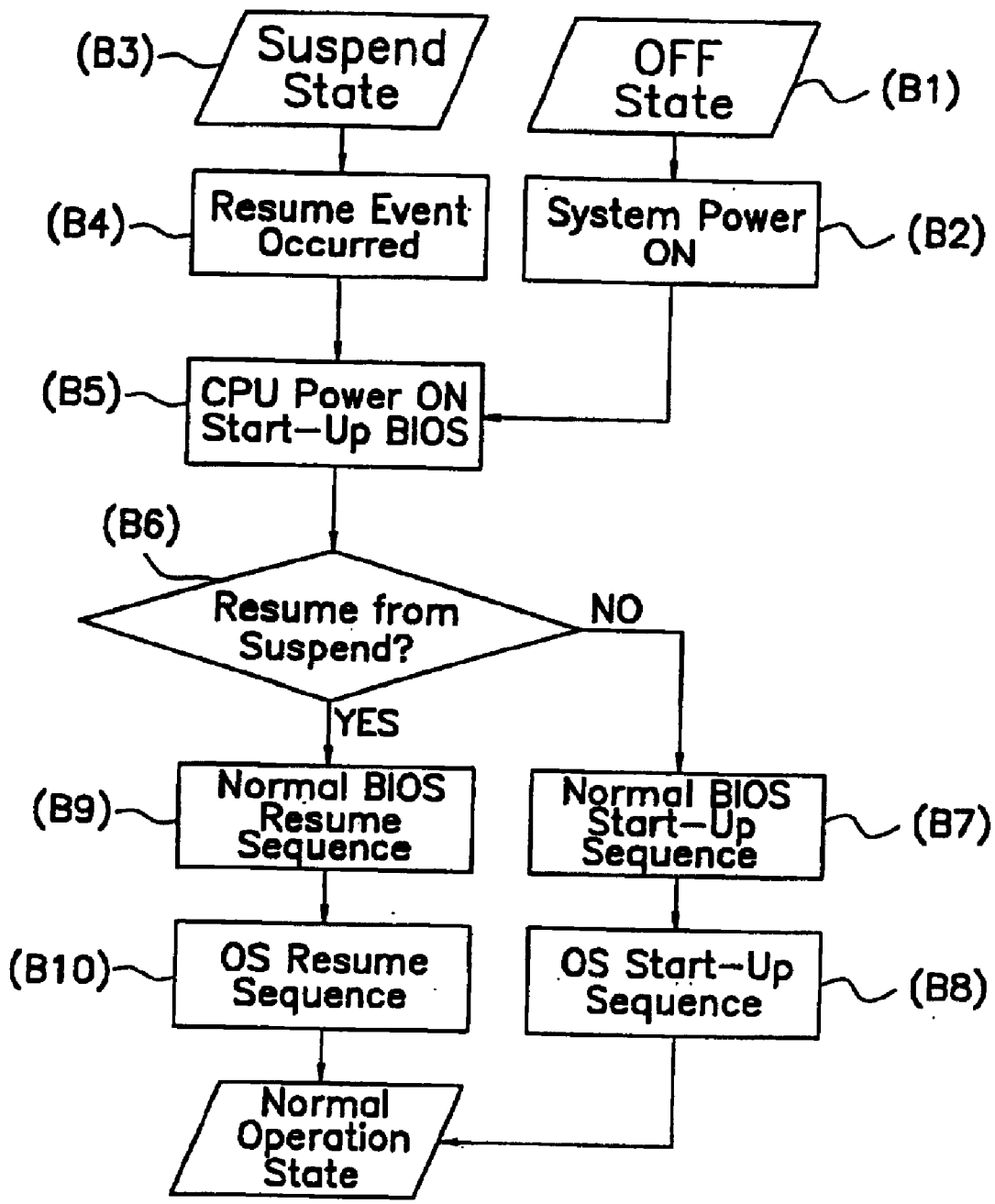
FIG. 5 is a flow chart of conventional resume processing and start-up processing according to the conventional example.

FIG. 3 is a flow chart of resume processing and start-up processing of the embodiment of the present invention. If start-up of the information device is start-up by system power ON (A4) from an OFF state (A1) in which a power switch is off, or by occurrence of a resume event from a suspend state (A2), or start-up from a specific interface section or from a specific input/output device (A6), from a suspend state (A3), an operational power of the processor (CPU) is turned on, and BIOS start-up is performed (A7). At this moment, upon starting up from the suspend state (A5, A6), a suspend flag is set.

Further, in step (A6), the information device has an interface section for connecting in wireless with a PDA as a specific interface section, has a configuration for bringing only a wireless receiving function into the operation state, and when receiving a wake-up signal from the PDA, sets an exclusive operational mode flag.

After turning on the operational power of the processor (CPU), the information device determines whether or not the start-up is wake-up by the exclusive operational mode (A8). That is, the information device determines whether or not the exclusive operational mode flag is set. Then, in the case of steps (A1) and (A4), since the exclusive operational mode flag is not set, the information device determines whether or not the start-up is resume from the suspend state based on whether or not a suspend flag is set (A9), and in the case of the normal start-up from the OFF state, the information device executes a normal BIOS start-up sequence (A10) and executes an OS start-up sequence (A11) to transition to the normal operation state (A14).

In addition, in the case of steps (A2) and (A5), since the exclusive operational mode flag is not set but the suspend flag is set, the information device executes write-back of configuration information of all devices of the information device and the normal BIOS resume sequence for notifying the OS of a resume event (A12). Then, the OS executes resume processing including resume/configuration processing of devices, resume/update processing of system setting, and resume/update processing of an application (A13), then transitions to the normal operation state (A14), and clears the suspend flag.

In addition, in the case of steps (A3) and (A6), since the exclusive operational mode flag is set and the suspend flag is set, the information device executes an exclusive operational mode start-up sequence (A15). That is, the information device initializes predefined devices only. For example, as shown in (B) of FIG. 1, the information device initializes the CPU 1, the specific interface section 3-*k* having a wireless transmission-reception section, and control sections of the memory 5 and the HDD 6, and keeps the other devices in the suspend state. Then, the information device starts up an OS for the exclusive operational mode (A16), and transitions to the exclusive operational mode state (A17).

In this case, a case in which the OS for the normal operation mode and a simple OS for the exclusive operational mode are provided is shown, in which, in step (A16), the BIOS processing is completed already in step (A8) and, therefore, the resume/configuration processing of devices, the resume/update processing of system setting, the resume/update processing of an application, or the like can be omitted. Therefore, the information device can transition to the exclusive operational mode state in a short time.

In addition, the simple OS of the exclusive operational mode performs the input/output processing of data with the PDA by an application program, and if update of data occurs, can temporarily stores the data in the HDD 6 or the like, and can indicates that the update of data by the exclusive operational mode has occurred by setting a flag for update recognition of data. Further, in the case where the start-up from the suspend state is the exclusive operational mode, the information device executes processing by the simple OS in the state in which operational environment and various kinds of data in the normal operation mode state are fully stored, and when the processing is completed, transitions to the suspend state again.

The simple OS for the exclusive operational mode can be configured to be stored in a ROM on a motherboard in the similar manner as the BIOS, and also can be configured to be stored in the memory 5 on the HDD 6 in FIG. 1. In addition, the OS for the normal operation mode can be stored in the memory 5 or the HDD 6 in FIG. 1. Selective start-up of an OS in such a multi OS environment is already known, and it becomes possible to perform the selective start-up of the above-mentioned OS and the simple OS based on conditions on whether or not the exclusive operational mode flag is set.

As described above, for example, in the case where the information device is a notebook type personal computer and an interface section having a wireless transmission-reception function by a Bluetooth that is being standardized is provided, when a power switch is turned on by opening a display of a liquid crystal panel of the notebook type personal computer, various kinds of information processing is performed, and the display is closed in that state, the information device transitions to the suspend state (sleep state) in which state information indicating that information processing is in progress is kept and operational power for devices such as the display is supplied.

If reference to or update of data is performed from a PDA or the like having the wireless transmission-reception function in this state, a wake-up signal is forwarded to the personal computer from the PDA. Thus, as described above, the information device is brought into the exclusive operational mode, the simple OS is started up, read out data is forwarded to the PDA by the wireless transmission-reception function of the interface section in accordance with a data reference request or a data update request from the PDA, the data from the PDA is received by the wireless transmission-reception function of the interface section in accordance with the data update request, and the data is updated. This update of data is temporarily stored as updated data until the information device will be in the normal operation mode.

Therefore, when a request for reference to or update of data is generated with respect to a notebook type personal computer, it is possible to promptly perform reference to or update of data as the exclusive operational mode without opening the display and transitioning to the normal operation mode each time such a request is made. In addition, if a cellular phone is connected to a specific interface section by a cable, remote reference to or update of data can be made possible via a mobile communication network by automatic receiving function of the cellular phone.

Embodiments (A) A first embodiment of an information device according to the present invention will be described with reference to FIGS. 6 through 8.

In this first embodiment, a case of giving a wake-up instruction for starting up each functional section having stopped its operation using a Bluetooth IF that is a wireless interface is considered.

A notebook type personal computer 100 as the information device according to this embodiment comprises a CPU 101 for controlling each section, a chipset 102 including a bus control function, a memory 105 including a ROM, a RAM and the like. In addition, man-machine interfaces such as an input/output device 104 including a keyboard or a pointing device such as a touch pad, a track ball or a mouse, a display 107 configured of a liquid crystal display, and an audio apparatus 108 such as a speaker are connected to the chipset 102. Moreover, a hard disk drive (HDD) 106 that is capable of writing and reading various kinds of data is connected to the chipset 102.

In addition, as an interface section capable of performing a wake-up instruction on each functional section from a power-off state or a suspend state, a Bluetooth IF 131, a network interface 132 for LAN, a modem 133 for enabling connection to networks 300, and the like is connected to the chipset 102. In this embodiment, a case in which the Bluetooth iF 131 is actually used as the interface section for performing the wake-up instruction is also considered.

A PDA 200 for performing transmission and reception of data with the notebook type personal computer 100 using the Bluetooth IF is provided with a CPU 201 for controlling each section, a memory 202 including a ROM and a RAM, a display 203 consisting of a liquid crystal display, and a Bluetooth IF 204 for performing transmission and reception of data with the Bluetooth IF 131 of the notebook type personal computer 100. The PDA 200 is provided with an input apparatus for inputting data(not shown) in addition to the above.

Figure 6:
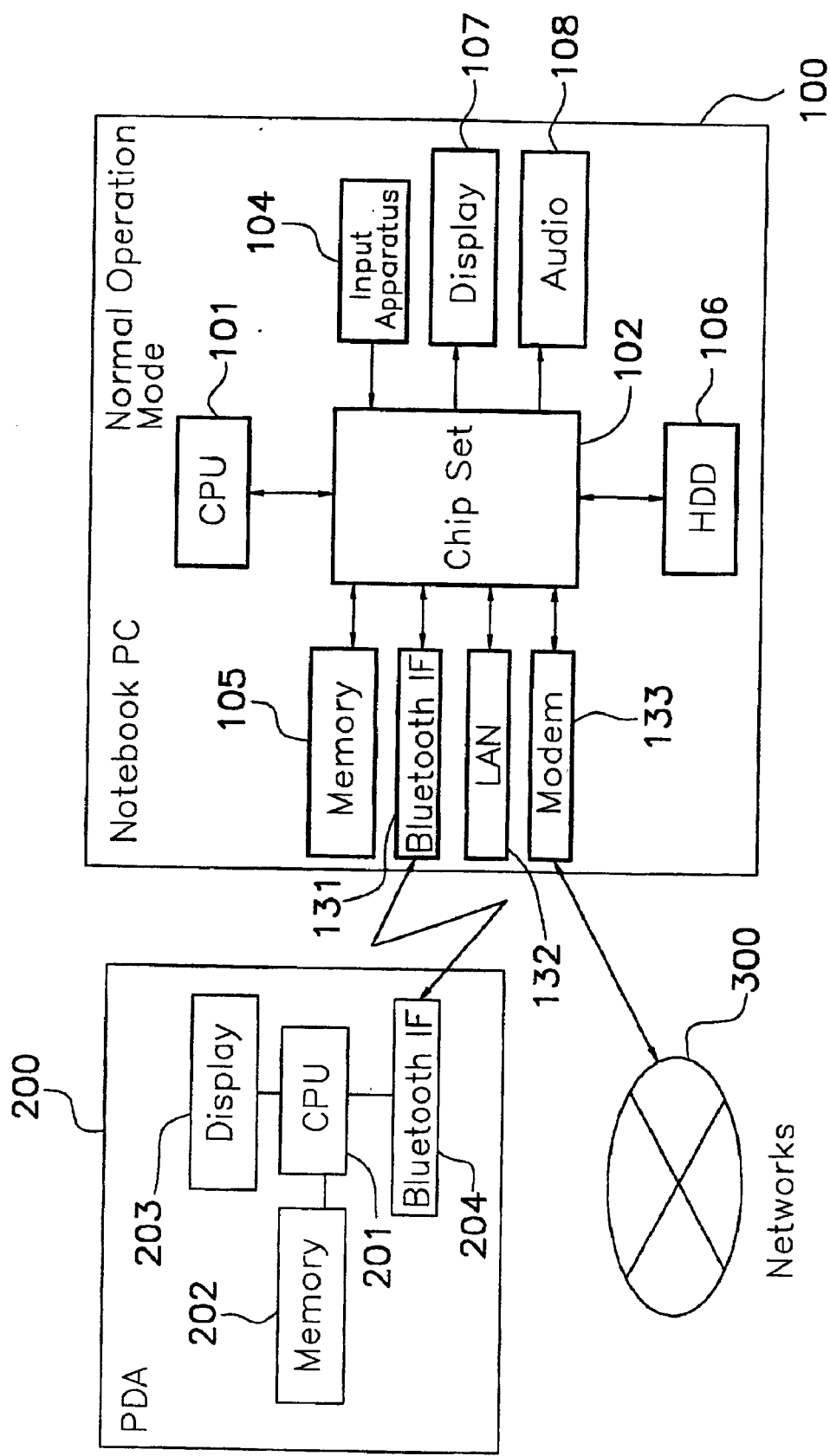
FIG. 6 is a control block diagram illustrating operations of a normal operation mode according to a first embodiment.

In the notebook type personal computer 100, electric power is supplied to each functional section in a normal operation mode, and, as shown by bold lines in FIG. 6, electric power is fully supplied to each section of the CPU 101, the chipset 102, the memory 105 and the HDD 106, the man-machine interfaces such as the input apparatus 104, the display 107 and the audio apparatus 108, and peripheral interfaces such as the Bluetooth IF 131, the network interface 132 for LAN and the modem 133.

In such a normal operation mode, all the man-machine interfaces and peripheral interfaces can be used. A user can input data or an instruction by performing operation using a keyboard or a pointing device such as a touch pad, a track ball or a mouse that is prepared as the input apparatus 104. In addition, data and various images are displayed on a liquid crystal panel prepared as the display 107 based on an instruction from the user or an instruction from a system. Similarly, the note type personal computer 100 causes a speaker prepared as the audio apparatus 108 to generate sounds by performing processing such as opening a file of voice data based on an instruction from the user or an instruction from the system. Moreover, it becomes possible to access an intranet or the Internet through the network interface 132 for LAN or the modem 133, or cooperate with peripheral apparatuses through the Bluetooth IF 131.

Figure 7:
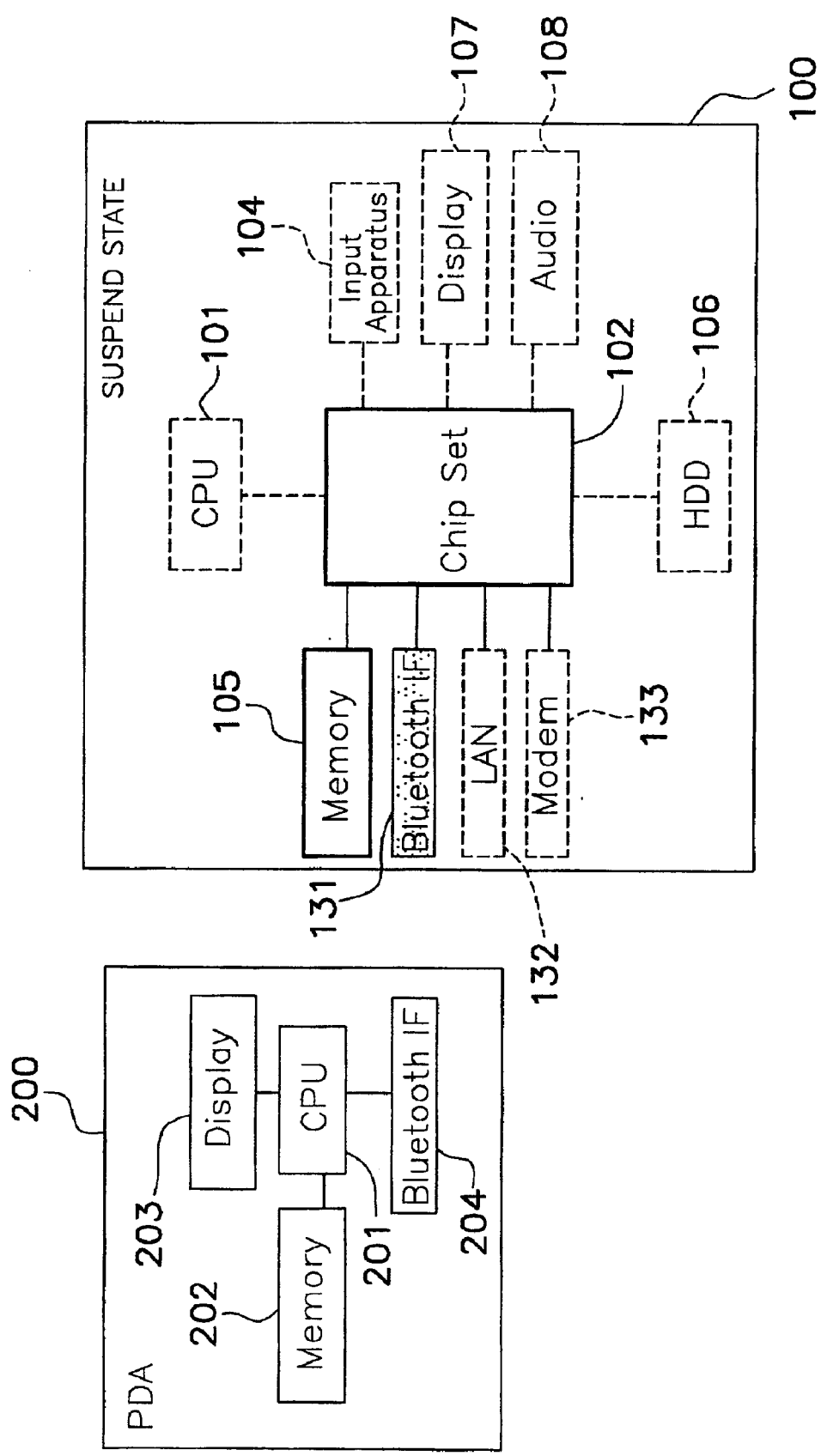
FIG. 7 is a control block diagram illustrating operations in a suspend state according to the first embodiment.

If the notebook type personal computer 100 is in the suspend state, electric power is supplied only to a part of the chipset 102, the memory 105 and the Bluetooth IF 131 as shown by bold lines of FIG. 7. At this moment, in the chipset 102, electric power is supplied only to required minimum functional sections such as a real time clock function, a memory refresh clock providing function, and a wake-up function. In addition, in the memory 105, memory refresh to a DRAM is only performed.

In the Bluetooth IF 131, electric power is supplied only to an RF receiving section capable of receiving a signal from a Bluetooth IF 204 provided in the PDA 200, and a wake-up functional section for making other functional sections having stopped operation to wake up upon receiving a signal from the Bluetooth IF 204 provided in the PDA 200, and other functional sections are in the suspend state. Therefore, the notebook type personal computer 100 is configured such that, when the notebook type personal computer 100 is in the suspend state, a signal from the Bluetooth IF 204 of the PDA 200 is received by the RF receiving section of the Bluetooth IF 131, based on which a wake-up event is generated by the wake-up functional section.

In the case where the PDA 200 accesses the notebook type personal computer 100 and transmits and receives data, transmission and reception of data is executed wireless by the Bluetooth IF provided in both of the PDA 200 and the notebook type personal computer 100. In the notebook type personal computer 100 in the suspend state as shown in FIG. 7, if a signal transmitted by the Bluetooth IF is received from the PDA 200, after setting a flag indicating that the signal is a wake-up event and an ID of the PDA 200 in a register, the Bluetooth IF 131 transmits the wake-up event to the chipset 102.

The chipset 102 having received the wake-up event from the Bluetooth IF 131 sets a flag of the wake-up event in its own register, and returns power supply to the CPU 101.

The CPU 101 having the returned electric power accesses the ROM in which a BIOS is stored, and executes a BIOS code. In the initial stage of start-up processing (before normal detection processing of a resume event and initialization processing of a chipset or the like), the CPU 101 detects a flag of the wake-up event of the chipset 102, and performs initialization of the Bluetooth IF 131 that is the interface section having generated the wake-up event.

Moreover, the CPU 101 reads out the flag of the wake-up event and the ID of the PDA 200 that are set in the register of the Bluetooth IF 131, recognizes that the access is an access from the PDA 200, and returns power supply to necessary functional sections. For example, if a functional section required for accessing from the PDA 200 is the HDD 106, the notebook type personal computer 100 is configured such that power supply is only returned to the HDD 106.

The CPU 101 thereafter starts up the OS for the exclusive operational mode stored in the ROM, and performs necessary initialization in the OS. The OS for the exclusive operational mode can be configured, for example, of a special purpose Linux customized only for necessary functions, and can be stored in the ROM in which the BIOS is stored, or can be installed in the HDD 106.

Figure 8:
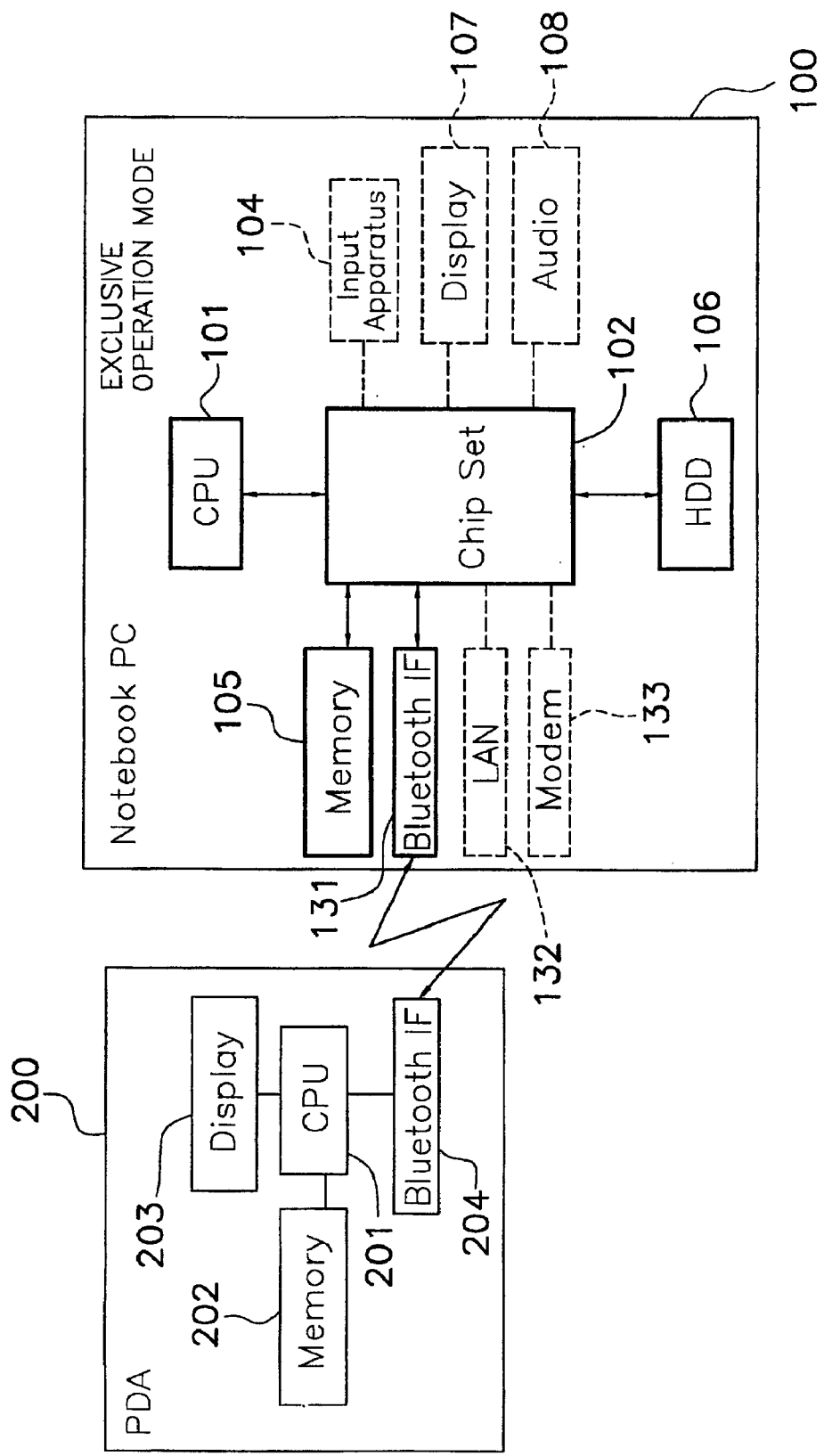
FIG. 8 is a control block diagram illustrating operations of an exclusive operational mode according to the first embodiment.

In this way, in the notebook type personal computer 100 when started up in the exclusive operational mode, electric power is supplied only to the CPU 101, the chipset 102, the memory 105, the Bluetooth IF 131 and the HDD 106 as shown by bold lines of FIG. 8. This makes an access from the PDA 200 possible without making the other functional sections wake up by supplying electric power to the functional sections that are utilized via the Bluetooth IF from the PDA 200. Therefore, electric power is not supplied to the functional sections other than the CPU 101, the chipset 102, the memory 105, the Bluetooth IF 131 and the HDD 106, and initialization processing is not required for the functional sections. In such an exclusive operational mode, since only control of the memory 105 and the HDD 106 and control of the Bluetooth IF 131 are sufficient, the OS for the exclusive operational mode can have a simple configuration. In addition, in such an exclusive operational mode, since resources to be used are a few, functional sections can be set to wake up instantaneously, and power consumption in this mode can be reduced.

In the exclusive operational mode, in order to refer to or update data on the notebook type personal computer 100 from the PDA 200, corresponding application software is started up on the OS for the exclusive operational mode, and input/output of, reference to or update of data is executed. At this moment, without directly changing data on the OS for the normal operation mode, the data is temporarily stored in the HDD 106 or the like as data on the OS for the exclusive operational mode, and a data change recognition flag for recognizing update, formation or generation of data is set in a predefined region of the HDD 106.

In the exclusive operational mode, at the point when the processing is completed or there is no access to data, the notebook type personal computer 100 transitions to the suspend state again by the OS for the exclusive operational mode.

During execution of processing by the OS for the exclusive operational mode, after the Bluetooth IF 131 generates the wake-up event based on data reception from the PDA 200, a memory area that stores data of operational environment and data for programs held for the OS for the normal operation mode is protected.

If the notebook type personal computer 100 is started up by the normal operation mode, the notebook type personal computer 100 transitions from the suspend state to the normal operation mode in accordance with an input from the input apparatus 104 such as a keyboard or a pointing device including a touch pad, a track ball, a mouse or the like. If a lid switch is set which switches between the suspend state and the normal operation mode according to opening and closing of the display 107 configured of a liquid crystal display unit, the notebook type personal computer 100 can be configured to transition from the suspend state to the normal operation mode by opening the display 107. In this way, if the notebook type personal computer 100 in the suspend state is started up from the suspend state to the normal operation mode by a man-machine interface, the data of operational environment held by the normal resume processing is written back to hardware or the like, and the notebook type personal computer 100 returns to the hardware state the notebook type personal computer 100 was in before it transitioned to the suspend state.

Thereafter, when application software relating to data that has been updated in the exclusive operational mode is started up, the notebook type personal computer 100 refers to the data change recognition flag set on the OS for the exclusive operational mode, and if there has been update or preparation of data on the OS for the exclusive operational mode, the notebook type personal computer 100 converts the data on the OS for the exclusive operational mode stored in the HDD 106 to data of the OS for the normal operation mode to update data.

With such a configuration, it is possible to shorten the time for starting up from the suspend state when the notebook type personal computer 100 is started up in the exclusive operational mode via the Bluetooth IF 131, and the time for inputting and outputting data in and from the PDA 200 can be reduced.

In the suspend state, by supplying electric power to at least a receiving section and a wake-up functional section of the network interface 132 for LAN and the modem 133, it is possible to perform a wake-up instruction from the network interface 132 for LAN or the modem 133.

(B) A second embodiment of an information device according to the present invention will be described with reference to FIGS. 9 through 11.

In this second embodiment, a case in which a wake-up instruction is applied to cooperation of a home server and an electric home appliance to be connected over a home network will be considered.

A home server 400 can be configured of a normal personal computer, and comprises a CPU 401 for controlling each section, a chipset 402 including a bus control function, a memory 405 including a ROM and a RAM, and the like. In addition, man-machine interfaces including an input/output device 404 including a keyboard or a mouse, a display 407 configured of a CRT or a liquid crystal display, and an audio apparatus 408 configured of a speaker or the like are connected to the chipset 402. Moreover, a hard disk drive (HDD) 406 capable of writing and reading various kinds of data is connected to the chipset 402.

In addition, as an interface section capable of performing a wake-up instruction on each functional section from a power-off state or a suspend state, an interface 431 for an indoor power-line LAN, an interface 432 for the IEEE1394 that enables data input/output with an apparatus conforming to the IEEE1394, a modem 433 that enables connection to networks 300 and the like are connected to the chipset 402. An air conditioner 251, a refrigerator 252, a microwave 253, an electronic bulletin board 254, or the like is connected to the interface 431 for indoor power-line LAN via a light line 250. In addition, a videocassette recorder 261, a television 262 or the like that conforms to the IEEE1394 is connected the interface 432 for the IEEE1394.

Figure 9:
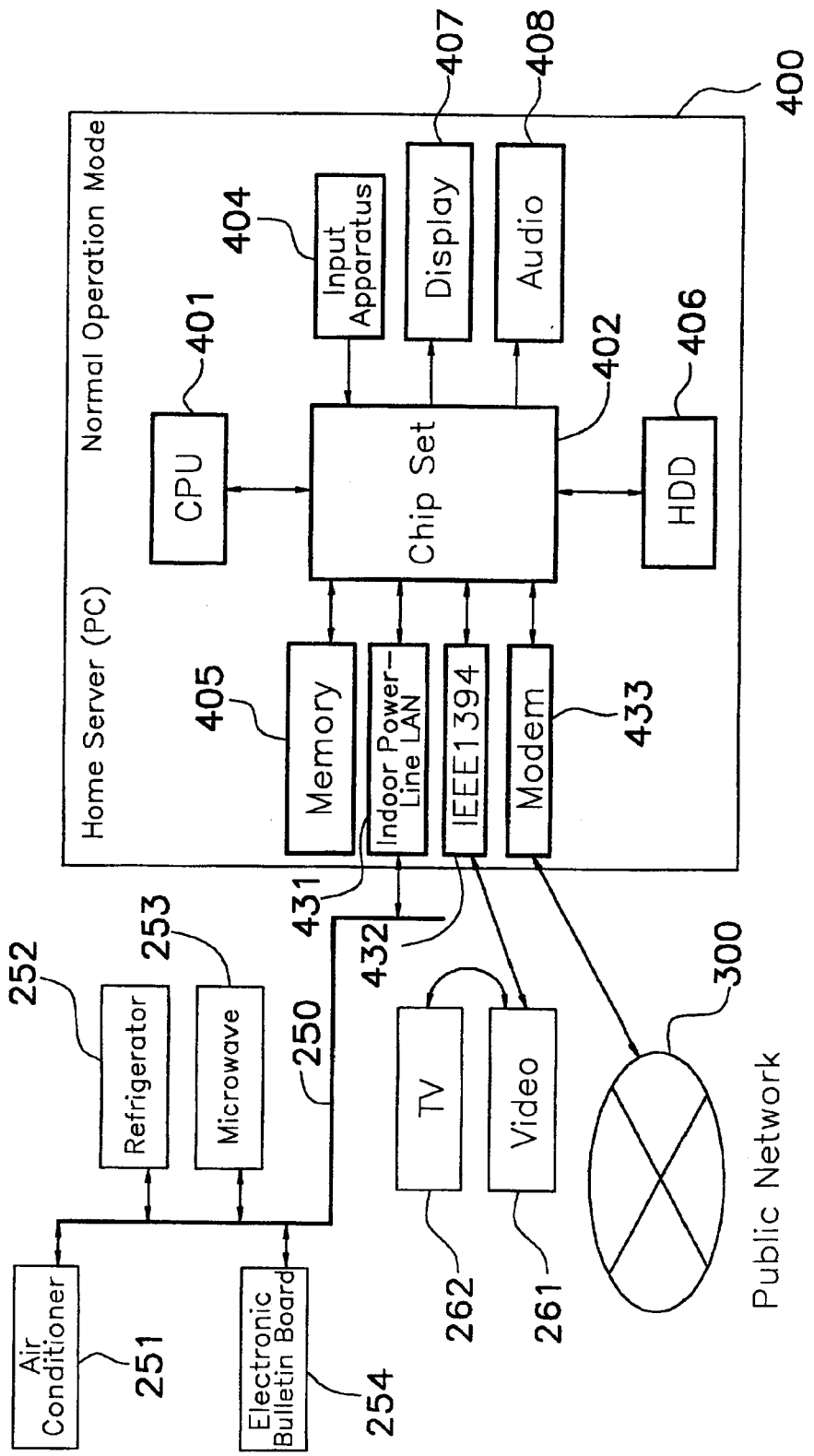
FIG. 9 is a control block diagram illustrating operations of a normal operation mode according to a second embodiment.

In the home server 400, electric power is supplied to each functional section in a normal operation mode, and as shown by bold lines of FIG. 9, electric power is fully supplied to each section of the CPU 401, the chipset 402, the memory 405 and the HDD 406, the man-machine interfaces such as the input apparatus 404, the display 407 and the audio apparatus 408, and peripheral interfaces such as the interface 431 for indoor power-line LAN, the interface 432 for the IEEE1394 and the modem 433. In such a normal operation mode, all the man-machine interfaces and peripheral interfaces can be used, and editing videos by the videocassette recorder 261, and cooperation with electric home appliances such as the air conditioner 251, the refrigerator 252 and the microwave 253, or the electronic bulletin board 254 are possible.

Figure 10:
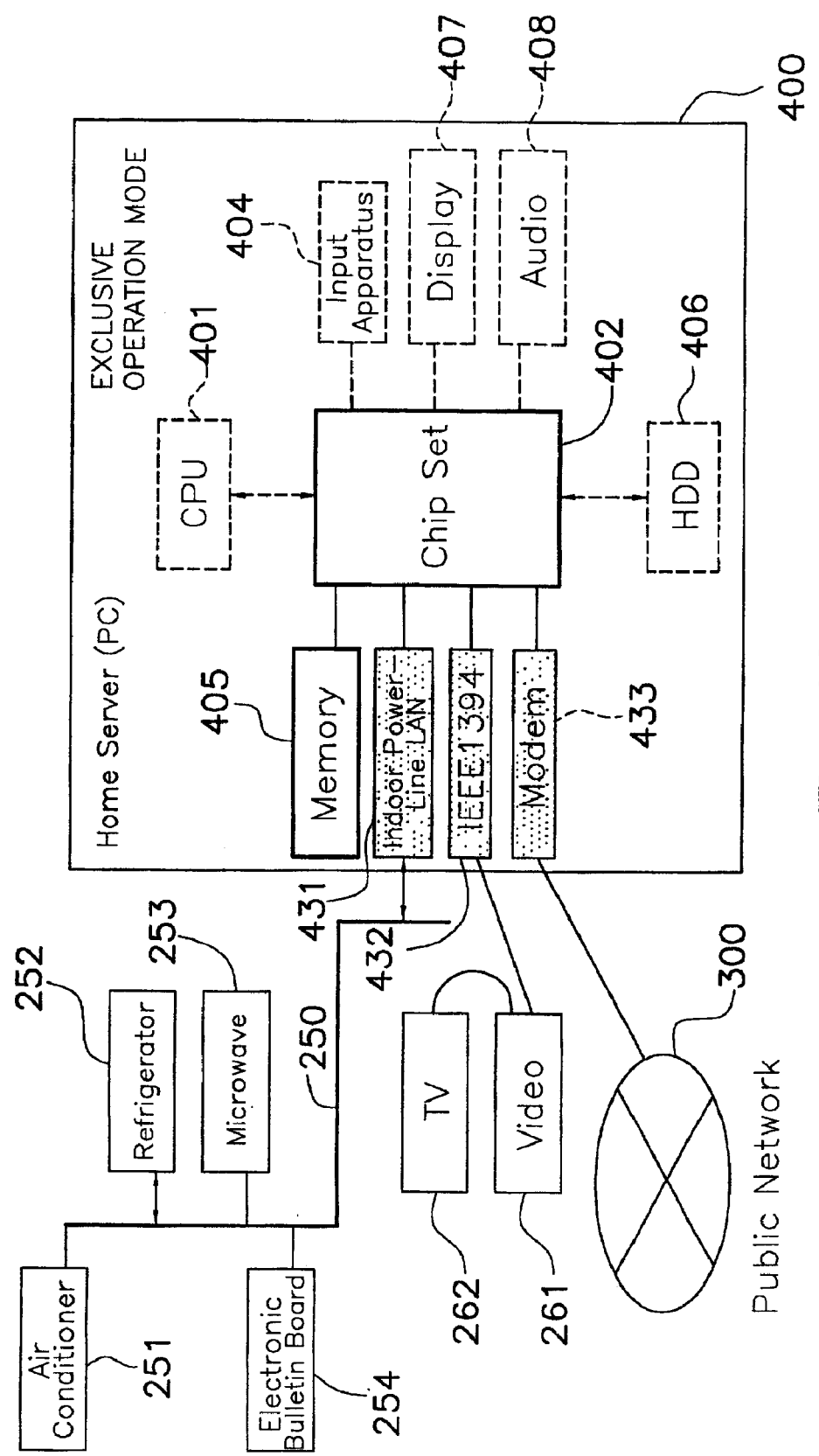
FIG. 10 is a control block diagram illustrating operations in a suspend state according to the second embodiment.

If the home server 400 is in a suspend state, as shown by bold lines of FIG. 10, electric power is supplied only to a part of the chipset 402, the memory 405, the interface 431 for indoor power-line LAN, the interface 432 for the IEEE1394 and the modem 433. At this moment, in the chipset 402, electric power is supplied only to required minimum functional sections such as a real time clock function, a memory refresh clock providing function, a wake-up function or the like. In addition, in the memory 405, memory refresh to a DRAM is only performed.

In various interface sections such as the interface 431 for indoor power-line LAN, the interface 432 for the IEEE1394 and the modem 433, electric power is supplied only to an external signal receiving section and a wake-up functional section, and other functional section are in the suspend state. Therefore, the home server 400 is configured such that, when in the suspend state, the home server 400 receives a signal from peripheral apparatuses such as the electric home appliances 251 to 253, the electronic bulletin board 254, and the videocassette recorder 261 or an access of a packet from the networks 300, and generates a wake-up event by the wake-up functional section based on the signal or the access.

In the home server 400 in the suspend state as shown in FIG. 10, a case in which an access is made from the refrigerator 252 via the indoor power-line LAN will be considered.

When receiving a indoor power-line LAN signal from the refrigerator 252 via the light line 250, after setting a flag indicating the indoor power-line LAN signal is a wake-up event and an ID of the refrigerator 252 in a register, the interface 431 for indoor power-line LAN transmits the wake-up event to the chipset 402.

The chipset 402 having received the wake-up event from the interface 431 for indoor power-line LAN sets the flag of the wake-up event by the indoor power-line LAN in its own register, and returns power supply to the CPU 401.

The CPU 401 having the returned electric power accesses the ROM in which a BIOS is stored, and executes a BIOS code. In the initial stage of start-up processing (before normal detection processing of a resume event and initialization processing of a chipset or the like), the CPU 401 detects a flag of the wake-up event stored in the register of the chipset 402, and performs initialization of the interface for indoor power-line LAN that is the interface section having generated the wake-up event.

Moreover, the CPU 401 reads out the flag of the wake-up event and the ID of the refrigerator 252 that are set in the register of the interface 431 for indoor power-line LAN, recognizes that the access is an access from the refrigerator 252, and returns power supply to necessary functional sections. For example, if a functional section required for accessing from the refrigerator 252 is the HDD 406, the home server 400 is configured such that power supply is only returned to the HDD 106.

The CPU 401 thereafter starts up the OS for the exclusive operational mode stored in the ROM, and performs necessary initialization in the OS. As in the first embodiment, the OS for the exclusive operational mode can be configured, for example, of a special purpose Linux customized only for necessary functions, and can be stored in the ROM in which the BIOS is stored, or can be installed in the HDD 406.

Figure 11:
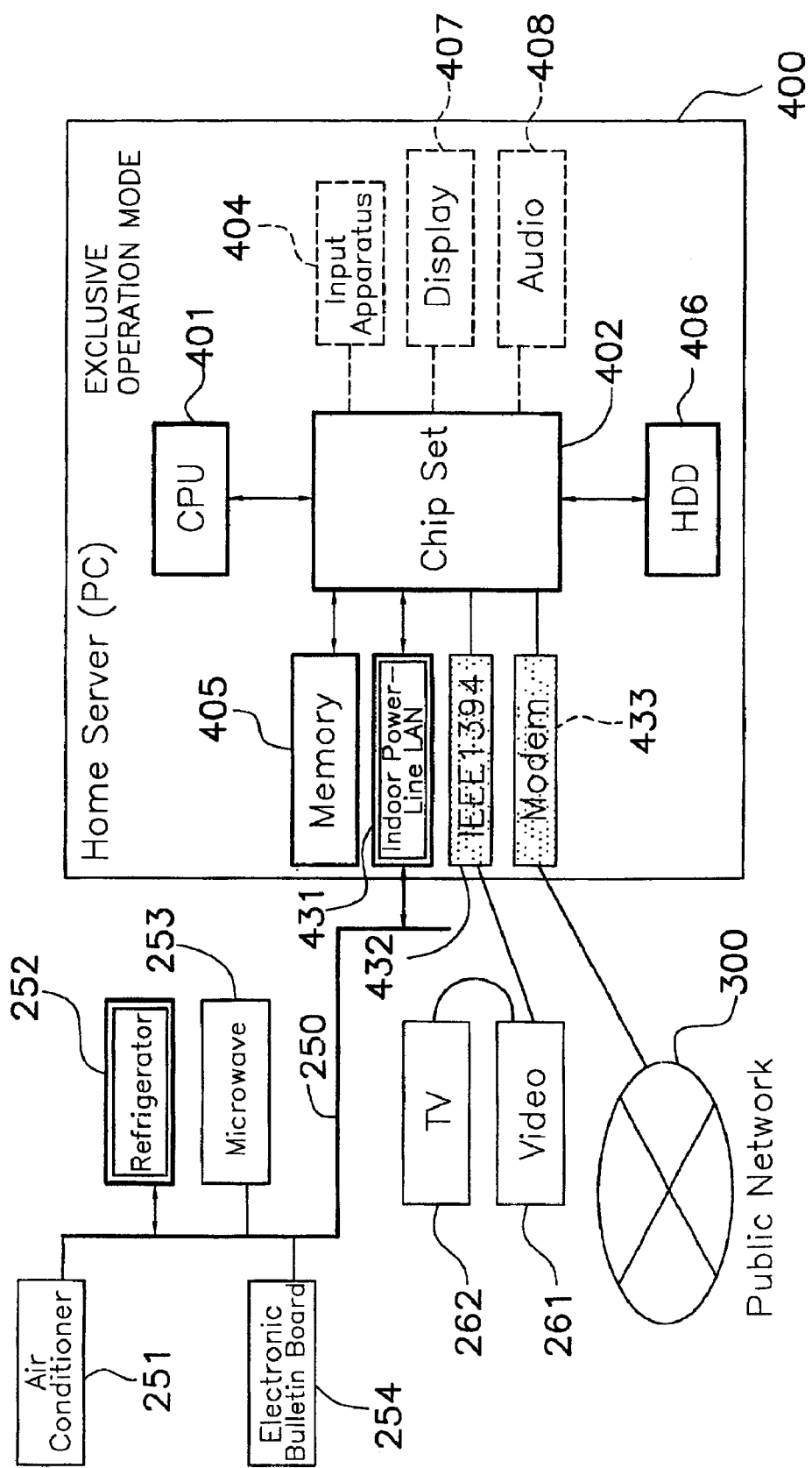
FIG. 11 is a control block diagram illustrating operations of an exclusive operational mode according to the second embodiment.

In this way, in the home server 400 when started up in the exclusive operational mode, electric power is supplied only to the CPU 401, the chipset 402, the memory 405, the interface 431 for indoor power-line LAN and the HDD 406, and a part of the interface 432 for the IEEE1394 and the modem 433 as shown by bold lines of FIG. 11.

In such an exclusive operational mode, unlike the normal operation mode shown in FIG. 9, electric power is supplied only to the functional sections to be utilized from the refrigerator 252 via the indoor power-line LAN (here, the CPU 401, the chipset 402, the memory 405, the interface 431 for indoor power-line LAN and the HDD 406) and a part of the interface 432 for the IEEE1394 and the modem 433, and electric power is not supplied to the other functional sections.

This makes it unnecessary to perform initialization processing for the functional sections other than those to be utilized from the refrigerator 252 via the indoor power-line LAN. In such an exclusive operational mode, since only control of the memory 405 and the HDD 406 and control of the interface 431 for indoor power-line LAN are sufficient, the OS for the exclusive operational mode can have a simple configuration. In addition, in such an exclusive operational mode, since resources to be used are a few, functional sections can be instantaneously set to wake up, and power consumption in this mode can be reduced because electric power supplied to the interface 432 for the IEEE1394 and the modem 433 may be minimum that is required for wake-up.

In the exclusive operational mode, in order to refer to or update of data on the home server 400 from the refrigerator 252, corresponding application software is started up on the OS for the exclusive operational mode, and input/output of, reference to or update of data is executed. At this moment, without directly changing data on the OS for the normal operation mode, the data is temporarily stored in the HDD 406 or the like as data on the OS for the exclusive operational mode, and a data change recognition flag for recognizing update, formation or generation of data is set in a predefined region of the HDD 406.

In the exclusive operational mode, at the point when the processing is completed or there is no access to data, the home server 400 transitions to the suspend state again by the OS for the exclusive operational mode.

During execution of processing by the OS for the exclusive operational mode after the interface 431 for indoor power-line LAN generates the wake-up event based on data reception from the refrigerator 252, a memory area that stores data of operational environment and data for programs held for the OS for the normal operation mode is protected.

If the home server 400 is started up by the normal operation mode, the home server 400 transitions from the suspend state to the normal operation mode in accordance with an input from the input apparatus 404 such as a keyboard or a mouse. If a resume button for switching between the suspend state and the normal operation mode is set in the home server 400, it is possible to configure the home server 400 such that the home server 400 transitions from the suspend state to the normal operation mode by the operation of the resume button. In this way, if the home server 400 in the suspend state is started up from the suspend state by a man-machine interface in the normal operation mode, data of operational environment held by normal resume operation is written back to hardware or the like, and the home server 400 returns to a hardware state the home server 400 was in before it transitioned to the suspend state.

Thereafter, when application software relating to data that has been updated in the exclusive operational mode is started up, the home server 400 refers to the data change recognition flag set on the OS for the exclusive operational mode, and if there has been update or preparation of data on the OS for the exclusive operational mode, the home server 400 converts the data on the OS for the exclusive operational mode stored in the HDD 406 to data of the OS for the normal operation mode to update data.

With such a configuration, it is possible to shorten the time for starting up from the suspend state when the home server 400 is started up in the exclusive operational mode via the interface 431 for indoor power-line LAN, and the time for inputting and outputting data can be reduced.

Similar processing is performed in the other electric home appliances such as the air conditioner 251 and the microwave 253, the electronic bulletin board 254, and the videocassette recorder 261 via the IEEE1394 access the home server 400.

As described above, the present invention is for dividing an operation mode upon starting up an information device from either a power-off state or a suspend state into a normal operation mode that enables use of entire functions as an information processing function and an exclusive operational mode that enables use of a part of functions as an information processing function, and selecting the normal operation mode in the case of normal start-up conditions and the exclusive operational mode in the case of start-up conditions from a specific interface section or input/output device, and has advantages of reducing power consumption and shortening time required for reference to and update of data, or the like, by selecting the exclusive operational mode that has short wake-up time.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. An information-processing device configured with at least one communication interface section enabling a wake-up instruction for starting up operationally stopped functional units in a power-off state or a suspend state, a man-machine interface, a memory, and a processor, connected by a chipset having a bus control function, the information-processing device characterized in that:

an operational mode for the functional units, when started up from either said power-off state or said suspend state, a normal operational mode use-enabling the functional units in their entirety including the man-machine interface, or an exclusive operational mode use-enabling some of the functional units, including use-enabling said communication interface section executing the wake-up instruction and having performed input/output processing of data, said memory, said processor and said chipset;

one of said normal operation mode and said exclusive operational mode is selected according to said communication interface section executing the wake-up instruction, wherein the exclusive operational mode is selected to supply operational power to, and perform information processing on, only resources used in the exclusive operational mode, when the information-processing device is started up according to the wake-up instruction from said communication interface section; and when said exclusive operational mode is terminated, the information-processing device goes to its pre-start-up state, either said power-off state or said suspend state.

2. An information-processing device as set forth in claim 1, characterized in that data changed in the exclusive operational mode and data change recognition flags indicating data has been changed are stored in a predetermined memory area different from a memory area for storing data used in the normal operation mode.

3. An information-processing device as set forth in claim 1, characterized in that:

start-up time is shorter and power consumption is lower for said exclusive operational mode than for said normal operational mode; and further said normal operation mode and said exclusive operational mode are started up selectively or exclusively.

4. An information-processing device according to claim 1, characterized in having:

an operation system for said normal operation mode, and an operation system for said exclusive operational mode;

the information-processing device therein being configured to switch between said operation system for the normal operation mode and said operation system for the exclusive operational mode according to conditions for starting-up from said power-off state and said suspend state.

5. An information-processing device as set forth in claim 4, characterized in that said communication interface section is provided with a radio transmission-reception function;

the information-processing device therein being configured to set an exclusive operational mode flag, when said communication interface section via the radio transmission-reception function receives a wake-up signal in the suspend state, for causing a start-up process for said operation system for said exclusive operational mode to be carried out.

6. An information-processing device configured for selectively use-enabling functional units thereof from operationally stopped power-off or suspended states, the information processing device comprising:

at least one data communication interface section enabling a wake-up instruction for starting-up the functional units of the information-processing device from the power-off or suspended states;

a man-machine interface;

a memory;

a processor; and a chipset connecting the data communication interface section, the man-machine interface, the memory and the processor, said chipset in cooperation with said memory and said processor having a bus control function for bringing operational mode of the information-processing device functional units when started up from either said power-off state or said suspend state into one of a normal operational mode use-enabling the functional units in their entirety including the man-machine interface, and an exclusive operational mode use-enabling some of the functional units on starting up from either said power-off state or said suspend state, including said data communication interface section having performed input/output processing of data, said memory, said processor and said chipset; wherein said data communication interface section executing a wake-up instruction selects between said normal operation mode and said exclusive operational mode, wherein the exclusive operational mode is selected to supply operational cower to, and perform information processing on, only resources used in the exclusive operational mode, when the information-processing device is started up according to the wake-up instruction from said communication interface section; and when said exclusive operational mode is terminated, the information-processing device goes to one of said power-off state and said suspend state as its pre-start-up state.

7. An information-processing device configured with communication interface units, input/output devices, memory, a display unit and a central processing unit, connected by a chipset having a bus control function, the information-processing device characterized by:

an operational mode when the information-processing device is started up from either a power-off state or a suspend state, a normal operation mode use-enables functions of the information-processing device in their entirety as information processing functions, or an exclusive operational mode use-enables some functions of the information-processing device as information processing functions;

one of said normal operation mode and said exclusive operational mode is selected according to start-up conditions, wherein the exclusive operational mode is selected to supply operational power to, and perform information processing on, only resources used in the exclusive operational mode, when the information-processing device is started up according to a start-up condition from a communication interface unit or an input/output device.

8. An information-processing device as set forth in claim 7, characterized in that data changed in the exclusive operational mode and data change recognition flags indicating data has been changed are stored in a predetermined memory area different from a memory area for storing data used in the normal operation mode.

9. An information-processing device as set forth in claim 7, characterized in that:

start-up time is shorter and power consumption is lower for said exclusive operational mode than for said normal operational mode; and further said normal operation mode and said exclusive operational mode are started up selectively or exclusively.

10. An information-processing device according to claim 7, characterized in having:

an operation system for said normal operation mode, and an operation system for said exclusive operational mode;

the information-processing device therein being configured to switch between said operation system for the normal operation mode and said operation system for the exclusive operational mode according to conditions for starting-up from said power-off state and said suspend state.

11. An information-processing device as set forth in claim 10, characterized in that said communication interface unit is provided with a radio transmission-reception function;

the information-processing device therein being configured to set an exclusive operational mode flags, when said communication interface unit via the radio transmission-reception function receives a wake-up signal in the suspend state, for causing a start-up process for said operation system for said exclusive operational mode to be carried out.

12. A control method for an information-processing device configured with data communication interface units, input/output devices, a memory, a display unit and a central processing unit, connected by a chipset having a bus control function, the method comprising:

when the information-processing device is started up from either a power-off state or a suspend state, going into a normal operation mode use-enabling functions in their entirety as information processing functions, or going into an exclusive operational mode use-enabling some functions as information processing functions; and selecting between said normal operation mode and said exclusive operational mode according to start-up conditions, wherein the exclusive operational mode is selected to supply operational power to, and perform information processing on, only resources used in the exclusive operational mode, when the information-processing device is started up according to a start-up condition from a data communication interface unit or an input/output device or any combination thereof.

13. The method as set forth in claim 12, wherein:

said exclusive operational mode is selected according to start-up conditions from a designated one of said data communication interface units or a designated one of said input/output devices.

14. An information-processing device control method as set forth in claim 12, wherein:

the information-processing device has an operation system for said normal operation mode, and an operation system for said exclusive operational mode;

the control method therein further characterized in control-switching between said operation system for the normal operation mode and said operation system for the exclusive operational mode according to conditions for starting-up from said power-off state and said suspend state.

15. A recording medium storing a control program for an information-processing device configured with communication interface units, input/output devices, memory, a display unit and a central processing unit, connected by a chipset having a bus control function, the control-program controlling the information processing device according to a process comprising:

- executing a normal operation mode use-enabling functions of the information-processing device in their entirety as information processing functions;
- executing an exclusive operational mode use-enabling some functions of the information-processing device as information processing functions; and
- selecting said normal operation mode according to normal start-up conditions when the information-processing device is started up from either a power-off state or a suspend state, and selecting said exclusive operational mode according to start-up conditions from one of said communication interface units or one of said input/output devices.

16. An information-processing device configured with communication interface units, input/output devices, memory, a display unit and a central processing unit, connected by a chipset having a bus control function, characterized by:

- means for executing a normal operation mode use-enabling functions of the information-processing device in their entirety as information processing functions;
- means for executing an exclusive operational mode use-enabling some functions of the information-processing device as information processing functions; and
- means for selecting said normal operation mode according to normal start-up conditions when the information-processing device is started up from either a power-off state or a suspend state, and for selecting said exclusive operational mode according to start-up conditions from one of said communication interface units or one of said input/output devices.

* * * * *

UNITED STATES PATENT AND TRADEMARK OFFICE
CERTIFICATE OF CORRECTION

PATENT NO. : 6,904,535 B2  Page 1 of 1
APPLICATION NO. : 09/811523
DATED : June 7, 2005
INVENTOR(S) : Hiroshi Yamada et al.

It is certified that error appears in the above-identified patent and that said Letters Patent is hereby corrected as shown below:

Title Page,  [54] Title, line 4, change "WAKE UP" TO --WAKE-UP.

Column 15,  line 42, change "cower" to --power--.

Column 16,  line 32, change "flags" to --flag--.

Signed and Sealed this

First Day of August, 2006

JON W. DUDAS
*Director of the United States Patent and Trademark Office*